Aug. 24, 1965 N. KITZ ETAL 3,202,919
ELECTRIC CIRCUIT FOR PRODUCING AN OUTPUT PULSE OF LEADING EDGE SUBSTANTIALLY COINCIDENT WITH THE TRAILING EDGE OF AN INPUT PULSE
Filed Feb. 12, 1963
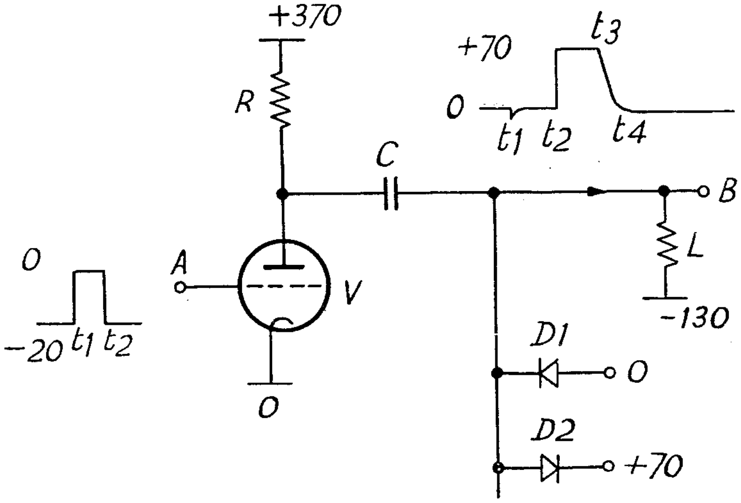
INVENTORS
NORBERT KITZ
JOHN GEORGE LLOYD
JAMES JOHN DRAGE
BY Pennie, Edmonds, Morton, Taylor and Adams
ATTORNEYS United States Patent Office 3,202,919
Patented Aug. 24, 1965

3,202,919
ELECTRIC CIRCUIT FOR PRODUCING AN OUTPUT PULSE OF LEADING EDGE SUBSTANTIALLY COINCIDENT WITH THE TRAILING EDGE OF AN INPUT PULSE

Norbert Kitz, John George Lloyd, and James John Drage, London, England, assignors to Bell Punch Company Limited, London, England, a British company Filed Feb. 12, 1963, Ser. No. 258,040
Claims priority, application Great Britain Feb. 27, 1962
5 Claims. (Cl. 328—67)

This invention relates to pulse-shaping circuit arrangements and it is an object of the invention to provide a circuit arrangement which will derive a flattopped output pulse having a well-defined leading edge which is substantially coincident in time with the trailing edge of an input pulse.

The invention comprises in a pulse-shaping circuit arrangement including a first resistive element, a capacitor and a second resistive element connected in series across a source of electric current, first and second asymmetrically conducting devices defining respectively the maximum and the minimum potentials of the junction between the capacitor and the second resistive element, and control means for reducing the potential of the junction between the first resistive element and the capacitor in response to an input pulse. The output pulse is taken from the junction between the capacitor and the second resistive element.

Preferably, the control means is a vacuum tube, the anode of which is connected to the junction between the first resistive element and the capacitor. In this case the input pulses are applied to the grid of this tube and the first resistive element constitutes the anode resistor thereof. The end of the first resistive element remote from the capacitor is connected to the positive terminal of the source of electric current and the cathode of the tube is connected to a point which has a potential which is suitably related to the said positive terminal in accordance with the characteristics of the tube. The end of the second resistive element remote from the capacitor is connected to the negative terminal of the source of electric current.

The first asymmetrically conducting device preferably has its cathode connected to the junction between the capacitor and the second resistive element and its anode connected to a source of potential which is more positive than the negative terminal of the source of electric current but less positive than the positive terminal of the source of electric current. The second asymmetrically conducting device preferably has its anode connected to the junction between the capacitor and the second resistive element and its cathode connected to a source of potential which is more positive than that to which the anode of the first asymmetrically conducting devices is connected.

The difference between the potential to which the anode of the first asymmetrically conducting device is connected and the potential to which the cathode of the second asymmetrically conducting device is connected defines the amplitude of the output pulse.

A method of performing the invention will now be described with reference to the accompanying diagrammatic drawing which is a simplified circuit diagram of one embodiment of the invention, and which also shows the input and output waveforms occurring in the circuit illustrated.

The circuit arrangement illustrated includes a vacuum tube V having its cathode connected to a point of zero potential, its anode connected through a resistor R to a point having a potential of +370 volts, and its grid connected to a terminal A which constitutes the input of the circuit. The anode of the tube V is also connected through a capacitor C to an output terminal B and a resistor L is connected between the terminal B and a point having a potential of −130 volts. The terminal B is also connected through a rectifier D1 to a point of zero potential and through a rectifier D2 to a point having a potential of +70 volts. The terminal B is connected to the cathode of the diode D1 and to the anode of the diode D2. A load may be connected to the terminal B, for example, across the resistor L.

The operation of the circuit illustrated is as follows:

In the absence of input pulses a potential of −20 volts is applied to the terminal A so that the tube V is biased into its non-conductive state. Under these conditions the capacitor C is charged through the resistor R and the resistor L so that its left-hand plate is at a potential of +370 volts and its right-hand plate is at zero potential. When an input pulse is applied to the terminal A, the potential of this terminal is raised from −20 volts to zero potential as shown by the pulse extending from time $t_1$ to time $t_2$. The input pulse causes the tube to become conductive from time $t_1$ to time $t_2$ with the result that the capacitor C discharges during this period through the rectifier D1 and the anode-cathode path of the tube V. The time constant of this discharge circuit is comparatively short and by time $t_2$ the voltage across the capacitor C is reduced to about 100 volts. The potential of the right-hand plate of the capacitor C tends to drop with the reduction in potential of the left-hand plate, but this drop is arrested by the rectifier D1 which becomes conductive as soon as the potential of its cathode is reduced below zero volts. Thus at time $t_1$ only a very small negative-going pulse appears in the output waveform.

At time $t_2$ the tube V again becomes non-conductive and the potential of the anode commences to rise. Thus the potential of both plates of the capacitor C also commences to rise until the rise in potential of the right-hand plate is checked by the rectifier D2. The potential of the right-hand plate of the capacitor C rises more slowly than that of the left-hand plate because the capacitor charges through the comparatively long time-constant circuit constituted by the resistor R and the resistor L in parallel with the load. However, as soon as the right-hand plate of the capacitor C exceeds +70 volts the rectifier D2 becomes conductive and any further rise in potential is prevented. Accordingly, the capacitor C commences to charge through the resistor R and the rectifier D2. The rise in potential of the right-hand plate of the capacitor C to +70 volts is substantially instantaneous, any delay that does occur being due to the capacitance of the rectifiers D1 and D2 in their non-conductive state and to the capacitance of the load.

The capacitor C continues to charge through the rectifier D2 until time $t_3$ and throughout this period the potential of the terminal B remains substantially constant so that there is effectively produced a flat-topped output pulse. As the capacitor C charges, the potential across it rises and the charging current falls until it is unable to maintain the potential of the right-hand plate of the capacitor above +70 volts. As soon as the potential of the right-hand plate of the capacitor C drops below +70 volts, the rectifier D2 ceases to conduct, but the capacitor continues to charge through the load and the resistor L. Accordingly, the potential of the terminal B commences to decrease at time $t_3$ until it reaches zero potential at time $t_4$. Any decrease below this potential is prevented by the rectifier D1. At this time the same conditions exist as before $t_1$ and, accordingly, the circuit is ready to operate in response to the next succeeding input pulse.

What we claim as our invention and desire to secure by Letters Patent of the United States is:

1. A pulse-shaping circuit arrangement including a first resistive element, a capacitor and a second resistive element connected in series across a source of electric current, first and second asymmetrically conducting devices defining respectively the maximum and the minimum potentials of the junction between the capacitor and the second resistive element, and control means for reducing the potential of the junction between the first resistive element and the capacitor in response to an input pulse.

2. A circuit arrangement as claimed in claim 1, wherein the control means is a thermionic tube the anode of which is connected to the junction between the first resistive element and the capacitor.

3. A circuit arrangement as claimed in claim 2, wherein the end of the first resistive element remote from the capacitor is connected to the positive terminal of the source of electric current, wherein the end of the second resistive element remote from the capacitor is connected to the negative terminal of the source of electric current, and wherein the cathode of the tube is connected to a point whose potential is less positive than of the positive terminal of the source of electric current.

4. A circuit arrangement as claimed in claim 3, wherein the first asymmetrically conducting device has its cathode connected to the junction between the capacitor and the second resistive element and its anode connected to a source of potential which is more positive than the negative terminal of the source of electric current and less positive than the positive terminal of the source of electric current.

5. A circuit arrangement as claimed in claim 4, wherein the second asymmetrically conducting device has its anode connected to the junction between the capacitor and the second resistive element and its cathode connected to a source of potential which is more positive than that to which the anode of the first asymmetrically conducting device is connected.

No references cited.

ARTHUR GAUSS, *Primary Examiner.*